J. LEVY-MAURICE & R. F. A. POYART.
STRETCHER.
APPLICATION FILED JAN. 30, 1911.
1,016,835.
Patented Feb. 6, 1912.
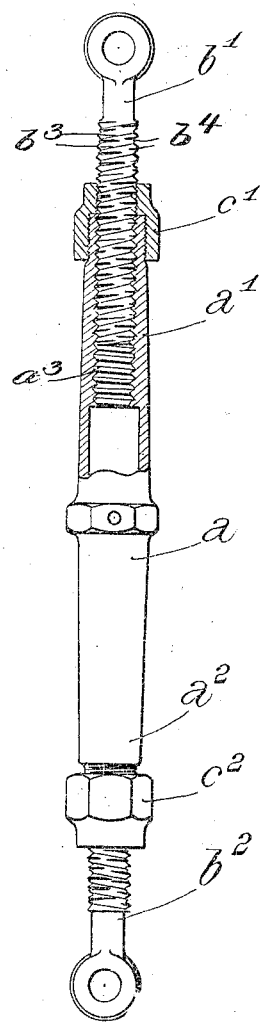
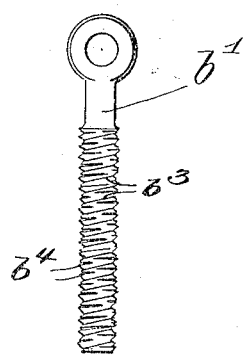
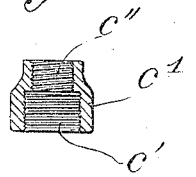
Witnesses:
Inventors
Jules Levy-Maurice
René F. A. Poyart

UNITED STATES PATENT OFFICE.

JULES LEVY-MAURICE AND RENÉ FREDERIC AUGUSTIN POYART, OF PARIS, FRANCE.

STRETCHER.

1,016,835.   Specification of Letters Patent.   Patented Feb. 6, 1912.

Application filed January 30, 1911. Serial No. 605,591.

*To all whom it may concern:*

Be it known that we, JULES LEVY-MAURICE and RENÉ FREDERIC AUGUSTIN POYART, citizens of the French Republic, respectively residing at 82 Boulevard des Batignolles and 24 Rue de l'Entrepot, Paris, France, have invented certain new and useful Improvements in Stretchers; and we do hereby declare the following to be a full, clear, and exact description of the invention, such as will enable others skilled in the art to which it appertains to make and use the same.

This invention relates to stretchers and refers more particularly to improvements in that class of such stretchers as are used for tightening the stays of aerial vessels.

With aerial vessels it is found in practice that owing to the continual vibrations, tremors and shocks, there is a constant risk of the accidental loosening or unscrewing of such stretchers, and the present invention refers to a construction by means of which such risk may be entirely obviated.

According to this invention, taking as an example the case of a stretcher or junction for uniting two stays, we provide the ordinary sleeve or body portion of the stretcher at each end with the ordinary oppositely directed internal screw threads. The ordinary rods carrying eyes or the like are provided with suitable threads corresponding with these internal screw threads. Each end of the body of the stretcher is externally screw threaded such threads extending in the reverse direction to the internal thread and the ordinary screw thread on the rod. The rod is further provided in addition to the ordinary or normal thread with a supplementary screw thread of the same pitch and direction as the reverse screw thread on the outside of the body of the stretcher. Finally, we provide for each end a nut which is furnished with two internally screw threaded portions of different diameters, one of which is adapted to engage with the external thread at the end of the body of the stretcher and the other with the corresponding thread on the rod. The second thread in the rod is preferably so formed that it differs from the normal thread as to the absolute value of the pitch but only to a comparatively small extent and it is preferably made shallow so that the normal thread is very little cut away and the rod upon which the thread is provided is not ovalized.

In order that our invention may be better understood we will now proceed to describe the same more fully with reference to the accompanying drawing, which illustrates merely by way of example, one method of carrying out the invention as applied to a stretcher or connection with two ends or branches.

Figure 1 shows the stretcher partly in section and partly in elevation. Fig. 2 shows one of the screw threaded rods in elevation. Fig. 3 is a section of the corresponding nut.

$a$ is the body or sleeve portion of the stretcher, the ends $a^1$ and $a^2$ of which are provided with the ordinary internal right-handed and left-handed screw threads $a^3$.

$b'$ and $b^2$ are the corresponding screw-threaded rods. These rods are provided, in addition to the ordinary screw threads $b^3$, with reverse screw threads $b^4$ which are less deeply cut than the said screw threads $b^3$ and which differ slightly in pitch from the same. Owing to the variation of the pitches, the points of intersection of the threads $b^3$ and $b^4$ do not come upon two straight lines extending longitudinally with respect to the rod, but trace out regular helices extending along the rod as shown clearly in the drawing.

$c'$ and $c^2$ are a pair of nuts corresponding to the ends $a'$ and $a^2$. Each of these nuts is internally screw threaded with threads $c'$ and $c''$ of two different diameters, but of the same pitch as the pitch of the reverse threads at the ends of the body $a$, so that each of the aforesaid nuts can be screwed with the portion $c''$ screwing upon the rod to which it belongs and with the screw threaded portion $c'$ screwing upon the extremity of the corresponding end of the body $a$ of the stretcher.

In use, the screw threaded rods $b'$ and $b^2$ being removed from the body $a$, the nuts $c'$ and $c^2$ are screwed on to them. The rods $b'$ and $b^2$ are then screwed into the body $a$ and the tightening is effected in the ordinary way by turning the body. The nuts $c'$ and $c^2$ are now screwed down so that they engage with the corresponding threads on the ends $a'$ and $a^2$ and the nuts are then locked or fixed in position. After this operation the whole device is absolutely locked as will be easily understood, for the nuts can only unscrew when the rods are fixed relatively to the body.

What we claim and desire to secure by Letters Patent of the United States of America is:—

A stretcher comprising an internally screw threaded sleeve, a rod in connection with the part to be stretched provided with a screw thread corresponding to the thread in the sleeve, a screw thread cut on the outside of and at the end of the sleeve, such screw thread being oppositely directed and of slightly different pitch from the thread on the inside of the sleeve and on the rod, another and secondary thread cut on the rod and corresponding in direction and pitch with the thread on the outside of the sleeve, and a nut provided with two internal screw threaded portions of different diameter but corresponding in direction and pitch with the secondary thread on the rod and with the external thread on the sleeve substantially as set forth.

In testimony whereof, we affix our signatures, in presence of two witnesses.

JULES LEVY-MAURICE.
RENÉ FREDERIC AUGUSTIN POYART.

Witnesses:
DEAN B. MASON,
PAUL BLUM.